(12) United States Patent
Volach (10) Patent No.: US 10,341,284 B2
(45) Date of Patent: Jul. 2, 2019

(54) METHODS AND SYSTEMS FOR RECIPIENT MANAGEMENT WITH ELECTRONIC MESSAGES

(71) Applicant: Pecan Technologies, Inc., Tortola (VG)

(72) Inventor: Ben Volach, Haifa (IL)

(73) Assignee: Pecan Technologies Inc, Road Town (VG)

( * ) Notice: Subject to any disclaimer, the term of this patent is extended or adjusted under 35 U.S.C. 154(b) by 86 days.

(21) Appl. No.: 14/738,972

(22) Filed: Jun. 15, 2015

(65) Prior Publication Data
US 2015/0372964 A1    Dec. 24, 2015

Related U.S. Application Data

(60) Provisional application No. 62/013,586, filed on Jun. 18, 2014.

(51) Int. Cl.
*G06F 15/16* (2006.01)
*H04L 12/58* (2006.01)
*H04W 4/14* (2009.01)

(52) U.S. Cl.
CPC .............. *H04L 51/34* (2013.01); *H04W 4/14* (2013.01)

(58) Field of Classification Search
CPC ................................. H04L 51/18; H04L 51/24
USPC .................................................. 709/206, 203
See application file for complete search history.

(56) References Cited

U.S. PATENT DOCUMENTS

| | | | | |
|---|---|---|---|---|
| 7,528,713 | B2* | 5/2009 | Singh | G01S 5/0252 340/309.7 |
| 8,352,555 | B2* | 1/2013 | Channabasavaiah | H04L 51/04 709/204 |
| 8,972,495 | B1* | 3/2015 | Borna | H04L 51/08 709/204 |
| 9,911,100 | B1* | 3/2018 | Cohen | G06Q 10/06 |
| 2003/0018724 | A1* | 1/2003 | Mathewson, II | G06Q 10/107 709/206 |
| 2003/0135559 | A1* | 7/2003 | Bellotti | G06Q 10/10 709/206 |
| 2007/0132597 | A1* | 6/2007 | Rodgers | A61B 5/1113 340/573.1 |
| 2008/0082651 | A1* | 4/2008 | Singh | G06Q 10/109 709/224 |
| 2008/0301252 | A1* | 12/2008 | Lipton | H04L 51/24 709/207 |
| 2013/0198260 | A1* | 8/2013 | Dow | G06Q 10/063114 709/203 |
| 2014/0051458 | A1* | 2/2014 | Khosla | H04W 4/029 455/456.1 |

(Continued)

*Primary Examiner* — Duyen M Doan (57) ABSTRACT

There is provided a method of recipient management with electronic messages having time defined actions, comprising: defining for an electronic message to a recipient, according to data inputted by a user at a user client terminal, one or more actions for the recipient to perform and a time frame for performance of the one or more actions; sending the electronic message to a recipient client terminal of a recipient to trigger a monitoring of performance of the one or more actions by the recipient at the client terminal during the time frame; receiving an indication of the performance of the one or more actions based on the monitoring from the recipient client terminal; and presenting on the user client terminal a notification in response to the indication.

40 Claims, 4 Drawing Sheets

(56) References Cited

U.S. PATENT DOCUMENTS

2015/0295877 A1\* 10/2015 Roman ................ H04W 4/029
709/203

\* cited by examiner

To:
Subject:
Action Category:
Defined Action:
Time Frame:
Action Priority:
Alert Scheme:
Action Number:
Conditions/Rules:
Message:

METHODS AND SYSTEMS FOR RECIPIENT MANAGEMENT WITH ELECTRONIC MESSAGES

RELATED APPLICATION

This application claims the benefit of priority under 35 USC 119(e) of U.S. Provisional Patent Application No. 62/013,586 filed Jun. 18, 2014, the contents of which are incorporated herein by reference in their entirety.

FIELD AND BACKGROUND OF THE PRESENT INVENTION

The present invention, in some embodiments thereof, relates to systems and methods for electronic messages and, more particularly, but not exclusively, to systems and methods for communication with electronic messages.

Electronic messages, for example, email, short message service (SMS), instant messages, or other types of messages, are sent by one individual to another. Messages may be used, for example, between friends for personal communication, between colleagues for business communication, or a single email may be sent to many people on a list as an announcement. Messages may contain attachments, such as pictures, documents, or music files. Messages may also contain links to internet sites.

The number of electronic messages sent and/or received for each person each day may be significantly large, potentially leading to information overload, inability to review or reply to the electronic messages, and potentially missing an important message buried within many junk or irrelevant emails.

Electronic message communication generally operates using store-and-forward. A message is composed and sent at the convenience of the sender. The sent message waits in the email box of the recipient. The recipient may access the message at his or her convenience, and perform one or more functions, such as: read, reply, forward, delete, access links, and download attachments.

SUMMARY OF THE PRESENT INVENTION

An aspect of some embodiments of the present invention relates to monitoring performance of a defined action performance for an electronic message by a recipient of the electronic message, the action required to be performed within a time frame.

According to an aspect of some embodiments of the present invention there is provided a method of recipient management with electronic messages having time defined actions comprising: defining for an electronic message to a recipient, according to data inputted by a user at a user client terminal, one or more actions for the recipient to perform and a time frame for performance of the one or more actions; sending the electronic message to a recipient client terminal of a recipient to trigger a monitoring of performance of the one or more actions by the recipient at the client terminal during the time frame; receiving an indication of the performance of the one or more actions based on the monitoring from the recipient client terminal; and presenting on the user client terminal a notification in response to the indication.

Optionally, the monitoring is performed by an application locally installed on the recipient client terminal Optionally, the monitoring is performed by messages sent from the recipient client terminal to an external source, the messages analyzed at the external source.

Optionally, the one or more actions is location based, and wherein the monitoring detects the recipient being at the location.

Optionally, the one or more actions is the recipient being in a location within a certain time frame.

Optionally, defining comprises defining a chain of the one or more actions that defines the order of performance of the one or more actions by the recipient.

Optionally, the chain is hierarchal and/or sequential.

Optionally, defining comprises defining rule dependent actions that detect performance of the rule dependent actions when one or more rule terms are held.

Optionally, the method further comprises receiving an update to the one or more actions, and sending a message to the recipient client terminal indicative of the updated action, to monitor performance of the updated action.

Optionally, the receiving an indication comprises receiving an electronic message automatically generated by the client terminal indicative of the performance.

Optionally, the method further comprises sending or locally presenting one or more alerts to the recipient to perform the one or more actions for the electronic message within the time frame. Optionally, the method further comprises sending or locally presenting multiple alerts over time to one or both of the recipient and the user based on the amount of time left until the end of the time frame.

Optionally, the time frame comprises a deadline time and/or a date for performing the one or more actions.

Optionally, the time frame comprises number of minutes left until expiration of the electronic message.

Optionally, the one or more actions is selected from the group: read electronic message, delete electronic message, forward electronic message, label folder with electronic message, move electronic message from inbox into a certain folder, click link in electronic message, press radio button in electronic message, reply to electronic message, open an attachment of the electronic message, reassign a task to another party, and mark task as completed.

Optionally, the electronic message is selected from the group: email, instant message, short message service (SMS) message.

Optionally, the method further comprises automatically adjusting the time frame in response to the monitoring of performance of the one or more actions, at least one of before and after the time frame has elapsed. Optionally, the adjusting comprises automatically snoozing the electronic message after the time frame has elapsed so that a deadline time and/or date is delayed by a predefined amount.

Optionally, defining comprises receiving a manual definition from the user of the electronic message.

Optionally, the method further comprises automatically deleting the electronic message after the time frame has lapsed.

Optionally, the method further comprises monitoring for performance of actions other than the one or more actions at least one of before and after the time frame. Optionally, the method further comprises providing the monitoring of actions other than the one or more actions for presentation on the user client terminal.

Optionally, each action of multiple one or more actions has a different time frame. Optionally, the method further comprises alerting one or both of the recipient and the user with different alerts based on the different time frames.

Optionally, the method further comprises alerting one or both of the recipient and the user that the electronic message will be expiring based on the amount of time left until the end of the time frame.

Optionally, sending comprises sending the electronic message to multiple recipients; and detecting comprises detecting the performance of the one or more actions by one or more of the multiple recipients.

Optionally, the method further comprises diverting the electronic message and related one or more actions, from the recipient to a different recipient.

Optionally, the one or more actions is performed outside the scope of the electronic message. Optionally, monitoring comprises monitoring for partial completion of the one or more actions.

According to an aspect of some embodiments of the present invention there is provided a system for electronic message communications having time defined actions, comprising: a hardware processor; a non-transitory memory having stored thereon program modules for instruction execution by the hardware processor, comprising: a definition module for defining for an electronic message to a recipient; according to data inputted by a user at a user client terminal, one or more actions for the recipient to perform and a time frame for performance of the one or more actions; a sending module for sending the electronic message to a recipient client terminal of the recipient; a detection module for monitoring of performance of the one or more actions by the recipient at the client terminal during the time frame, the monitoring triggered by the sending of the electronic message; a receiving module for receiving an indication of the performance of the one or more actions based on the monitoring from the recipient client terminal; a presentation module for presenting on the user client terminal a notification in response to the indication.

Optionally, the detection module resides on the recipient client terminal as a locally installed application, and the detection module is further programmed to send messages from the recipient client terminal to the receiving module, the receiving module installed on the user terminal.

Optionally, the detection module resides on the recipient client terminal, the detection module is programmed to send electronic messages to an analysis module located on an external server, the analysis module analyzing the contents of the electronic messages to determine when the action has been performed.

Optionally, the system further comprises an update module for updating the one or more actions.

Optionally, the system further comprises a user interface for manually receiving the one or more actions from the user of the electronic message.

Optionally, the system further comprises an email access module for accessing the email account of the recipient to perform the monitoring for performance of the one or more actions.

Optionally, the system further comprises a deletion module for deleting the electronic message from an email account of the one or both of the user and the recipient based on the detection.

Optionally, one or more of the modules resides on a remote server, one or more of the users and a recipient are registered users on the remote server, the remote server having access data for accessing email accounts of the one or more of the users and the recipient.

Optionally, the system further comprises a link module for generating a link to a server storing contents of the electronic message, wherein the sending modules sends the link to the recipient, wherein the detection module automatically detects the performance of actions based on the link, and wherein the definition module defines the action for the link.

Optionally, the system resides on a processor remotely located from the recipient and sender, the system acting as one or both of a client and a server with respect to one or both of the recipient and sender.

Optionally, the sent message contains metadata defining the action and time frame.

Optionally, the system further comprises a second hardware processor and a second non-transitory memory for storing modules, wherein the hardware processor and non-transitory memory storing the definition module, sending module, receiving module and presentation module are operated by the user; and the second hardware processor and second non-transitory memory storing the detection module are operated by the recipient.

Optionally, the system resides on a server remotely located from the recipient and user, the system further comprising a network interface for allowing one or both of the recipient and user to remotely access the system.

Optionally, the system further comprises a synchronization module for allowing the detecting module to operate in an offline mode without a network connection, the synchronization module connecting to a remote server when operating in an online mode with the network connection.

Optionally, the system further comprises an alert generating module for generating alerts to the recipient for performance of the one or more actions based on the time frame, the alert generating module generating alerts based on a local time module when in offline mode, and the alert generating module generating alerts based on synchronization with a time server when in online mode.

Optionally, the system further comprises an external action interface for monitoring actions of the recipient for performance of the one or more actions, wherein the one or more actions is outside the scope of the electronic message.

Optionally, the system further comprises one or more elements for monitoring actions of the recipient, comprising: a location based server for detecting the position of the recipient, a call module for monitoring phone calls of the recipient, a short message service (SMS) module for monitoring SMS sent by the recipient, a download module for monitoring application downloads by the recipient, and a purchase module for monitoring online purchases by the recipient.

Unless otherwise defined, all technical and/or scientific terms used herein have the same meaning as commonly understood by one of ordinary skill in the art to which the present invention pertains. Although methods and materials similar or equivalent to those described herein can be used in the practice or testing of embodiments of the present invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the present invention can involve performing or completing selected tasks manually, automatically, or a combination thereof. Moreover, according to actual instrumentation and equipment of embodiments of the method and/or system of the present invention, several selected tasks could be implemented by hardware, by software or by firmware or by a combination thereof using an operating system.

For example, hardware for performing selected tasks according to embodiments of the present invention could be implemented as a chip or a circuit. As software, selected tasks according to embodiments of the present invention could be implemented as a plurality of software instructions being executed by a computer using any suitable operating system. In an exemplary embodiment of the present invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the present invention are herein described, by way of example only, with reference to the accompanying drawings. With specific reference now to the drawings in detail, it is stressed that the particulars shown are by way of example and for purposes of illustrative discussion of embodiments of the present invention. In this regard, the description taken with the drawings makes apparent to those skilled in the art how embodiments of the present invention may be practiced.

In the drawings.

DESCRIPTION OF SPECIFIC EMBODIMENTS OF THE PRESENT INVENTION

The present invention, in some embodiments thereof, relates to systems and methods for electronic messages and, more particularly, but not exclusively, to systems and methods for communication with electronic messages.

An aspect of some embodiments of the present invention relates to systems and/or methods for monitoring a recipient for performance of a predefined action related to an electronic message within a time frame. Optionally, the recipient is monitored to detect whether or not the recipient has performed the predefined action within the time frame. Optionally, an indication of the action performance within the time frame is provided to the user that defined the action.

Optionally, the time frames are times (ranges, deadlines) by which the actions are to be performed. Optionally, conditions are defined in addition to, or instead of the time frame.

Optionally, the monitoring is automatically performed, for example, by a locally installed software application residing on a computer or other processor operated by the receiver. Optionally, the automatic monitoring is triggered when the recipient receives the electronic message.

Optionally, the desired action is performed on the electronic message itself, for example, the message is read. Alternatively or additionally, the desired action is performed based on the contents of the electronic message, for example, a meeting is scheduled based on the electronic message request. Optionally, the desired action is location based, for example, the recipient is requested to be at a certain location within the time frame by the contents of the electronic message.

Optionally, the desired actions are defined as a priority chain that denotes which action is to be performed when by the recipient. For example, higher priority actions are to be performed before lower priority actions. Alternatively or additionally, each desired action is associated with a different time frame, or each desired action is associated with the same time frame. The priority chain may be organized, for example, in a hierarchal and/or sequential manner.

Optionally, rule dependent actions are defined. Optionally, the performance of the action is determined when one or more of the rule terms are held.

Optionally, the action is updated after having been sent to the recipient.

Optionally, the recipient is monitored for performance of the updated action.

Optionally, the action is performed on the electronic message, for example, reading and/or replying to the electronic message. Optionally, the action changes the state of the electronic message, for example, from unread to read, from unflagged to flagged, or other changes in state.

Alternatively or additionally, the action is not performed on the electronic message. The action may be outside of the scope of the electronic message. For example, based on a location, based on an application performance and/or output, based on making a phone call, based on making a purchase, or other actions based outside the scope of the electronic message. Alternatively or additionally, the action is taken based on the electronic message, for example, based on the contents of the electronic message.

Optionally, performance of the action is monitored, for example, when the action has been taken or not within the time frame. Optionally, the state of the action is reported back to the sender, for example, an application locally installed on the device of the recipient automatically sends messages to the sender, and the received messages are read by the sender. In another example, the application sends messages to an external server (e.g., located on the internet). The messages may be analyzed by the server. The sender may log into the server (e.g., using a website) to view the status.

In effect, the system and/or method may be conceptualized as linking a supervisor to the electronic message, to help make sure that the desired action is performed. The supervisor may be sent along together with the electronic message (e.g., instructions embedded within the message), may be part of an electronic message reading program (e.g., feature on an email client), and/or may be an external program (e.g., having access to the electronic messages).

The system and/or method may help ensure that important emails, instant messages, short message service (SMS) messages and/or mailed tasks are acted upon during the allowed time frame, and do not get forgotten or lost. In this manner, the sender may monitor important emails, for example, to make sure that the email is acted upon by the recipient. Reminders or guidelines may be sent to help ensure that action is taken on the email within the time frame and/or condition of the action. Emails that are no longer relevant (e.g., expired actions) may be automatically removed. The number of irrelevant emails in the inbox of the recipient may be reduced.

Optionally, an action performance requirement defines at least both of the action and associated time frame for completion of the action. Alternatively or additionally, the action performance requirement defines multiple actions and a single time frame. Alternatively or additionally, the action performance requirement defines the action and multiple associated time frames. Alternatively or additionally, the action performance requirement defines multiple actions and multiple associated time frames. For example, the last time in the requirement may denote the final deadline, and/or earlier times may denote when to send reminders. In another example, different times denote different deadlines for different actions. Alternatively or additionally, the action performance requirement defines one or more conditions. The conditions may not be directly based on time. The conditions may be external conditions, for example, temperature, stock index value, replies to the electronic message by other recipients, or other conditions. In this manner, the actions may be defined in a sequential manner (e.g., to be performed one after the other), hierarchal manner (e.g., based on priority), and/or suspending condition (e.g., meeting one condition and/or performance of one action leads to requirement to perform other actions. For example, different results of the conditions may lead to different action performance requirements).

Optionally, the completion of the action is verified. Alternatively, incompletion of the action is detected. Optionally, partial completion is detected, for example, of non-message related actions.

Optionally, alerts are generated in response to incompletion of the action within the define time frame. Optionally, alerts are sent to the recipient with a reminder to complete the action for the electronic message. Optionally, alerts are sent based on an algorithm, for example, increasing in frequency as the deadline nears.

The generated reminders may help ensure that the actions are executed within the time limit associated with the defined action.

Before explaining at least one embodiment of the present invention in detail, it is to be understood that the present invention is not necessarily limited in its application to the details of construction and the arrangement of the components and/or methods set forth in the following description and/or illustrated in the drawings and/or the Examples. The present invention is capable of other embodiments or of being practiced or carried out in various ways.

Figure 1:
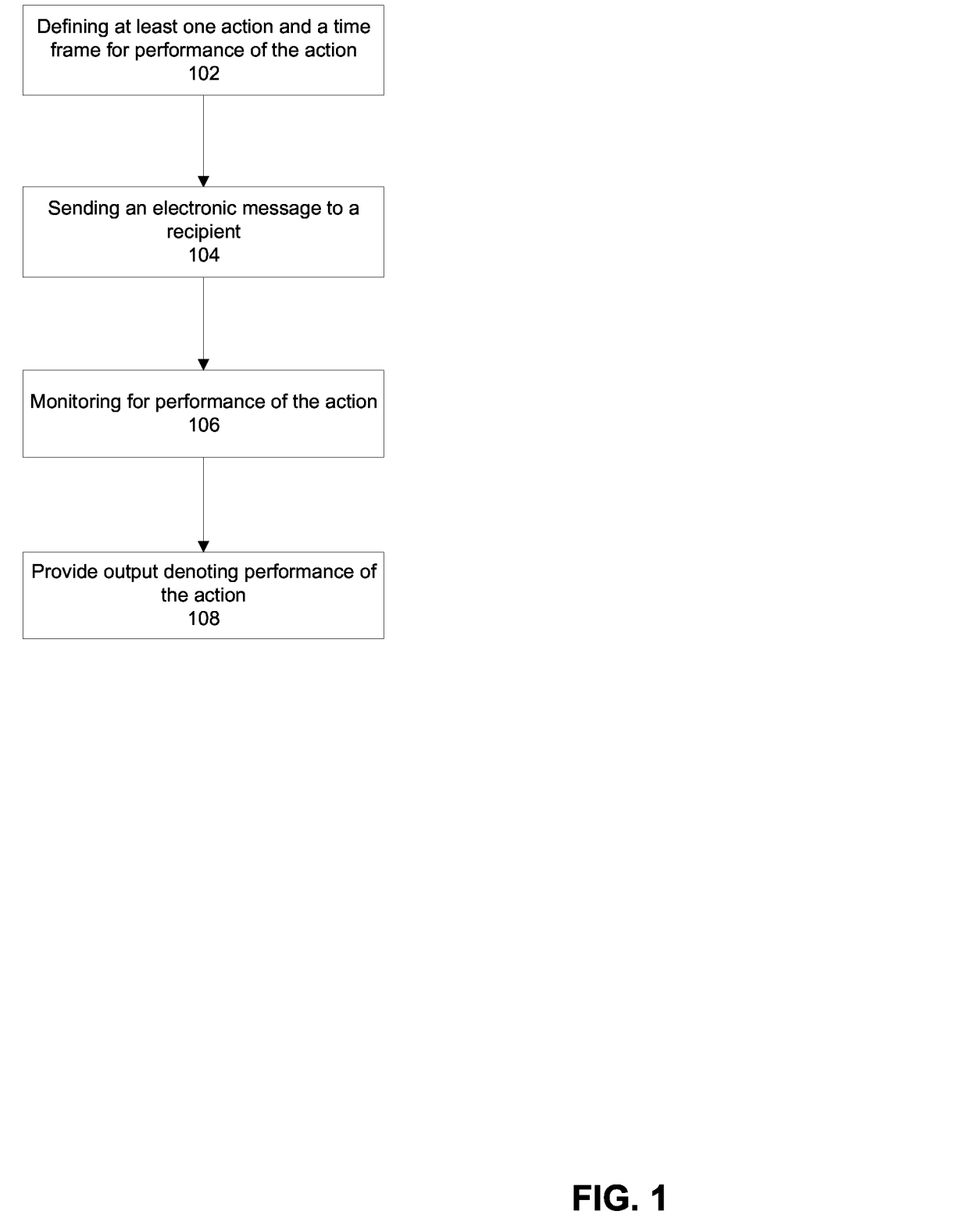
FIG. 1 is a flowchart of a method for managing a recipient based on electronic messages with defined actions, in accordance with some embodiments of the present invention.
Figure 3:
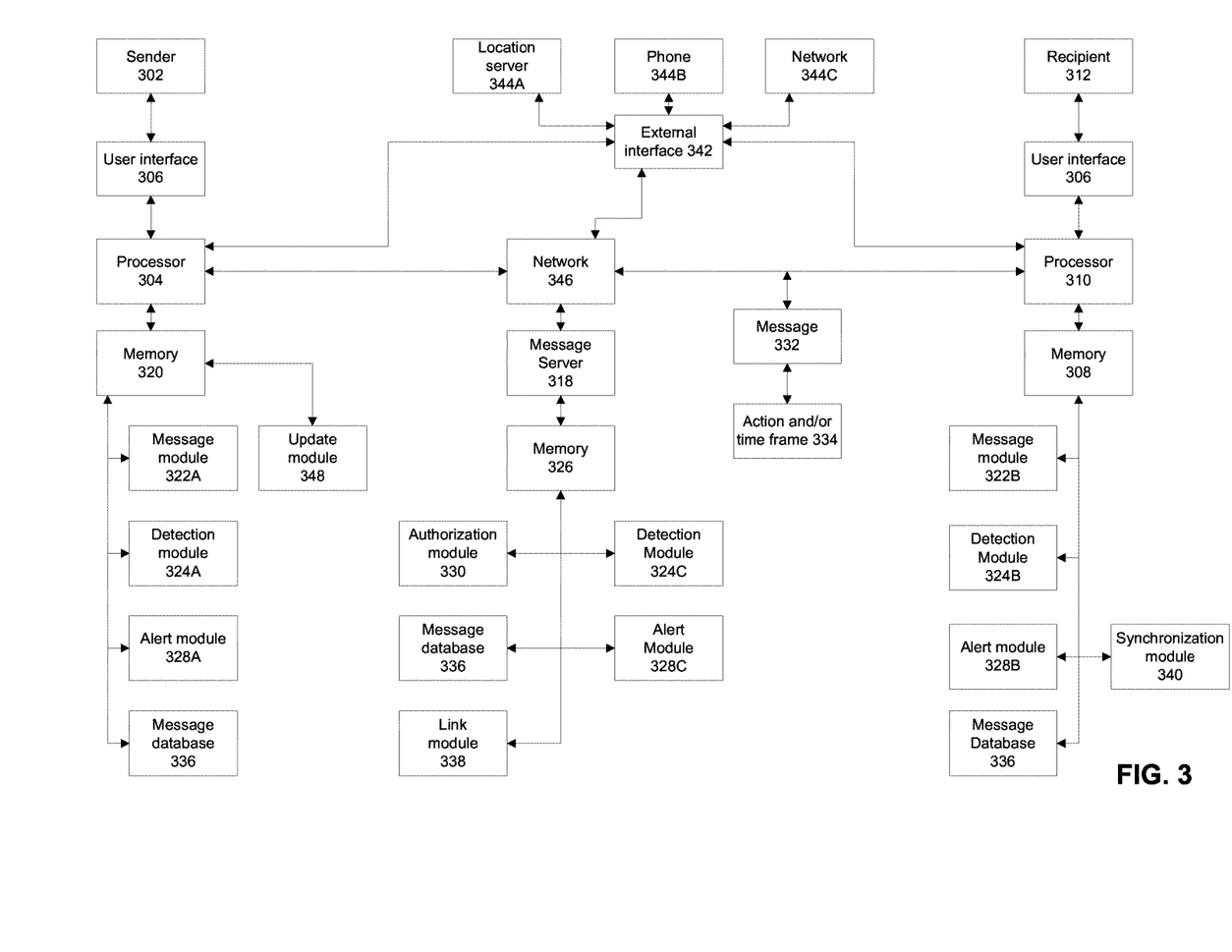
FIG. 3 is a schematic block diagram of a system for managing a recipient based on electronic messages with defined actions, in accordance with some embodiments of the present invention.

Referring now to the drawings, FIG. 1 illustrates a flowchart of a method for managing a recipient based on electronic messages with defined actions, in accordance with some embodiments of the present invention. Reference is also made to FIG. 3, which is a schematic block diagram of a system 300 for managing a recipient based on electronic messages with defined actions, in accordance with some embodiments of the present invention. The method of FIG. 1 may be performed using system 300, or one or more sub-components of system 300. One or more block of the method of FIG. 1 may be automatically performed by one or more sub-components of system 300.

The system and/or method may help a user in keeping track of important sent electronic messages. Users may send many electronic messages a day, some of which may be very important. Instead of manually following up for completion of actions based on the electronic messages, the method and/or system may automatically monitor the recipient for completion. Instead of the user keeping track of which messages were acted upon, and having to keep on following those that haven't been acted upon yet, the system and/or method may automatically generate reminder alerts to the recipient to help make sure that the required action has been performed. In this manner, the user may send the electronic message and assume the action has been done. The user may automatically be notified of incomplete actions, instead of having to manually keep track.

At 102, one or more actions for performance by a recipient of an electronic message are defined.

A user such as a sender 302 may define the action at a user client terminal (e.g., a processor 304 such as a user terminal, computer, Smartphone, tablet device, or other processors) by an optional user interface 306.

Optionally, the action is to be performed on a composed electronic message, for example, message 332. The message may be composed by using message module 322A, for example, an email program, an instant message program, an SMS program, or other message communication programs. Optionally, a time frame is defined by the user. The time frame denotes a due time and/or date by which the recipient (e.g., recipient 312) is required to perform the associated action based on the electronic message.

The action and/or time frame may be defined manually by the sender.

Alternatively, the action and/or time frame may be automatically defined by software, for example, all emails composed to employees by a supervisor have a two day expiration automatically generated. Message module 322A may contain a function to automatically define the action and/or time frame.

Optionally, the time frame denotes a date (calendar date, day of the week, day of the month, holiday, or other dates) and/or time by which to perform the action, for example, in 2 days, in 3 hours, in 30 min, by December 31, by noon on February 5, by 17:30 on Friday, by the $2^{nd}$ Sunday of the month, by Labor day, or other times and/or dates. Alternatively or additionally, a function and/or condition is defined that may or may not have a specific predetermined time and/or date deadline. The function and/or condition may be based on external factors. For example, when the Dow Jones Index reaches over 16000, when the outside air temperature falls below the freezing point, when a certain candidate is elected as president, when the remaining credit on the credit card of the recipient falls to below $1000, 3 days to respond after reading the electronic message, 2 days to purchase an item at a discount after forwarding the message to a friend, or other conditions and/or functions. The conditions and/or functions may be based on performance of other actions. For example, schedule the meeting when 5 or more recipients send emails showing interest in the topic, forward the electronic message after replying, or other conditions.

Optionally, the defined actions and/or time frames are encoded, for example, as data 334. Optionally, the defined actions and/or time frames (e.g., data 334) are encoded within the composed electronic message (e.g., message 332), for example, as metadata within the electronic message. Alternatively or additionally, the defined actions and/or time frames are encoded separately from the electronic message. For example, the defined actions and/or time frames are sent in parallel to the recipient with the composed message, for example, via a proxy and/or as links in the metadata of the message and/or in a different electronic message. For example, the defined actions may be stored on a remotely located message server 318.

Optionally, the time frame includes a single point in time. Alternatively, the time frame includes multiple points in time. Different actions may be associated with the different points in time, for example, different actions are to be performed by the recipient before the expiration of each time period.

Alternatively or additionally, the time frame defines a range of time during which the action is to be performed, for example, 10-11 AM. The range of time may be repeated, for example, until a defined time and/or date. For example, every day between 10 and 11 AM, until Sunday of next week. Optionally, the time frame defines a range of time during which the condition is to occur, and during which the action is to be performed. For example, the temperature is less than freezing between 10 and 11 AM.

Optionally, the action is an action to be taken by the recipient on the electronic message. For example, one or more of: read electronic message, delete electronic message, forward electronic message, label folder with electronic message, move electronic message from inbox into a certain folder, click link in electronic message, press radio button in electronic message, reply to electronic message, open an attachment of the electronic message, reassign a task to another party, manually mark task as completed, or other actions.

Optionally, the usage of software applications is monitored. For example, opening and editing of documents (e.g., to verify that the employee or supervisor looked at the document), accessing certain web pages (allowable or forbidden), running a virus scanning program (e.g., to check that scans are regularly performed), downloading music (e.g., when a friend requests the song), playing a game (e.g., in an interactive game, where one player is waiting for another player's turn), or other actions on applications.

An example of the defined action and associated time frame is: read message within 2 days.

In one example, a sequence of actions may define monitoring of a secretary. For example, the actions may be: schedule a meeting with a client, proof-read an electronic copy of a report from an employee, call an office supplies supplier to order more paper, forward important emails to the supervisor, go to the grocery store to buy juice for the staff meeting. The actions may be scheduled as a hierarchy based on importance, for example, the client meeting, followed by the email forwarding, then the report reading, and finally calling the supplier and buying the juice. Each action may be defined with different time frames, for example, schedule the meeting by 11 AM today, obtain the report by noon tomorrow, forward important emails on an ongoing basis every day between 2-3 pm, call the supplier by Friday next week, and buy the juice 1 hour before the meeting. Some actions may be directly based on the message, for example, scheduling the meeting. Some actions may be location based, for example, going to the store. Some actions may be application based, for example, reading the report. Once defined, the system and/or method may automatically monitor the secretary for completion of the actions within the time frames, for example, by monitoring actions taken on the message, by monitoring location, and/or by monitoring application usage. Reminders may be sent to the secretary to make sure tasks were not forgotten. The supervisor may be alerted to those items that have not been performed.

At 104, the composed electronic message with the defined action and/or time frame is delivered to a recipient. Optionally, the electronic message is delivered using store-and-forward (e.g., email). Alternatively or additionally, the electronic message is delivered in real time (e.g., instant message). Alternatively or additionally, the electronic message is not directly delivered. A different message indicating that the electronic message is waiting (e.g., on a remote server) may be delivered instead.

Different delivery methods may be used, for example, the message may be downloaded to a memory 308 electrically coupled to a processor 310 (e.g., recipient client terminal, Smartphone, tablet, laptop computer, desktop computer) operated by a recipient 312 (via a user interface 314). The recipient may read the message directly (e.g., displayed as a pop-up on the computer screen) or open a message module 322B (e.g., email program, email client, instant message program). In another example, the message is stored on a memory 316 of a message server 318 connected to a network 346. Recipient 312 remotely accesses message server 318 to read the message, for example, using processor 310. It is noted that sender 302 may also compose the electronic message by remotely accessing message server 318. Server 318 has a network interface for providing the remote access to sender 302 and/or recipient 312.

Optionally, at 106, the performance of the defined action within the time frame is monitored and/or automatically detected. For example, detection modules 324A-C residing on sender memory 320, recipient memory 308 and/or message server memory 326 monitor and/or detect the performance of the defined action.

Optionally, sending the electronic message triggers the action monitoring.

Alternatively or additionally, receipt of the electronic message by the recipient triggers the action monitoring. Alternatively or additionally, opening and/or reading of the message by the recipient triggers the action monitoring.

Optionally, at 108, output is provided based on the monitored and/or detected action.

Optionally, an indication of the performance of the action based on the monitoring is received from the recipient client terminal (e.g., recipient processor 310). The indication may be received, for example, by user processor 304 and/or message server 318. Optionally, a notification in response to the indication is presented on the user client terminal (e.g., user interface 306 such as a monitor). The notification may be received and/or presented, for example, as a pop-up message, as an email to be read, as a link to a web-site, or other methods.

Optionally, output of the detected action is provided when the action has been performed. Alternatively or additionally, output indicating that the action has not been performed is provided. For example, output that the action has not been performed is provided at regular intervals and/or continuously (e.g., current action state is shown).

Optionally, output is provided before the time deadline based on the time frame. Alternatively or additionally, output is provided after the time deadline.

Output may be provided to the sender and/or recipient.

Optionally, the sender is notified that the recipient handled the action.

Alternatively or additionally, the sender is notified that the action did not take place.

Figure 2:
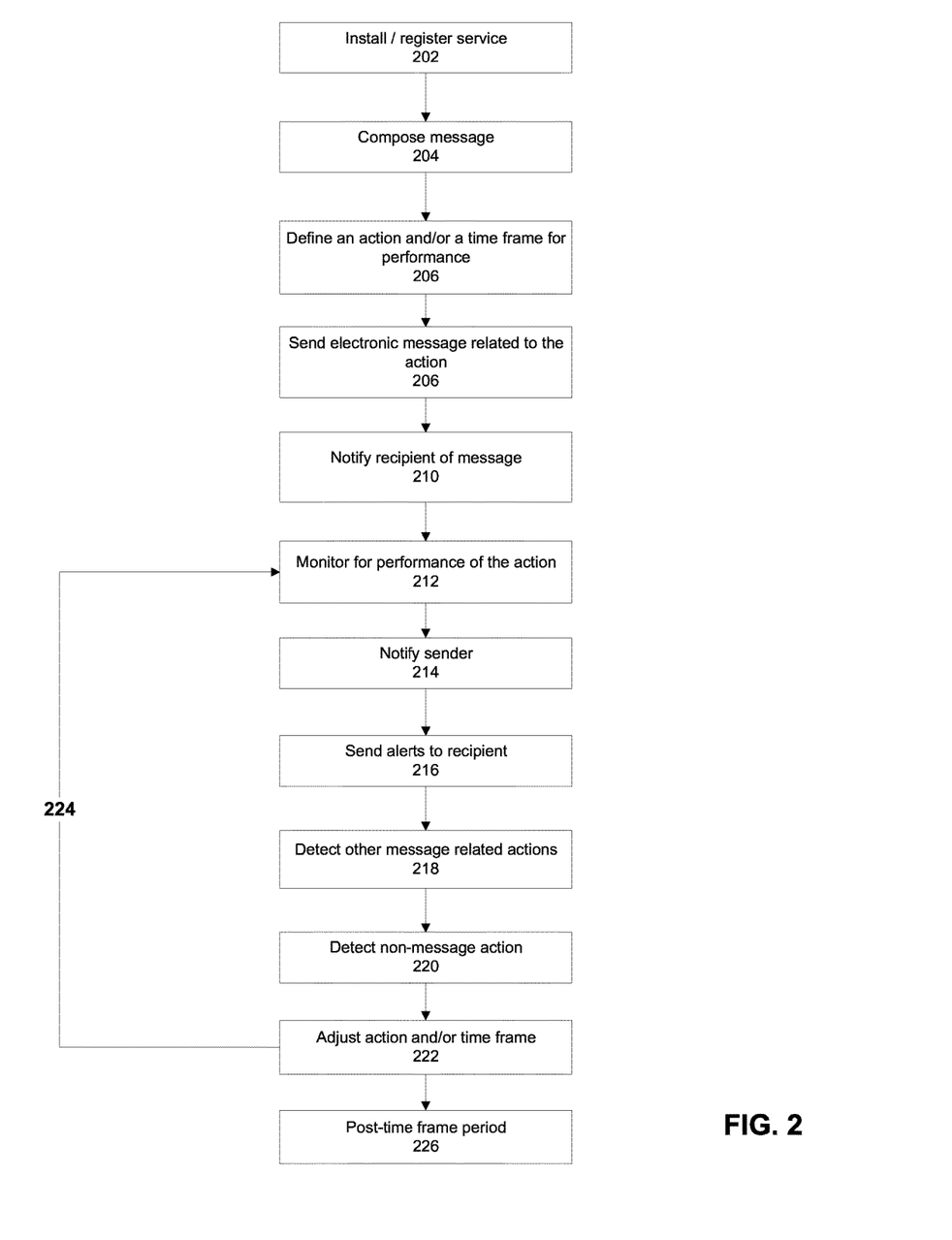
FIG. 2 is a detailed flowchart of the method of FIG. 1, in accordance with some embodiments of the present invention.

Reference is now made to FIG. 2, which is a detailed flowchart of the method of FIG. 1, in accordance with some embodiments of the present invention. System 300 of FIG. 3 may execute one or more of the automated blocks of FIG. 2, and/or components may be used to execute one or more blocks of FIG. 2 that may be manually performed. The method of FIG. 2 describes additional features and/or details of the method of FIG. 1.

Optionally, at 202, a software application to enable the service of sending electronic messages with defined actions is installed. Alternatively or additionally, the sender and/or receiver and/or other users (e.g., administrator) sign up for the service.

Alternatively or additionally, the service is already provided for users.

The software application (e.g., one or more modules described herein) may be installed on the computer operated by sender 302 (e.g., memory 320), the computer operated by recipient 312 (e.g., memory 308), on remote mail server 318 (e.g., memory 326), and/or on other computers. The software may be integrated with existing email, instant message, SMS, and/or other electronic message programs, for example, added during an upgrade. The software may be external to the existing electronic message programs, for example, loaded as a plug-in to a web-browser, and/or separately installed. The software may automatically log in to the account of the sender to track actions on email, and/or monitor the sender as he/she logs in.

For example, both sender and recipient may be registered users of the service. The sender and recipient may provide details for accessing their electronic message accounts (e.g., email login and password), for example, using the OAuth protocol or other credentials. The access details may be securely stored (e.g., using encryption), for example, by an authorization module 330 stored on memory 326 of message server 318. Automatically logging into the message account (e.g., inbox and/or other folders) may allow detection of the action performed on the electronic message and/or tracking of further activity on the electronic message (e.g., read, unread, flagged, forwarded), for example, by one or more of detection modules 324A-C.

Optionally, at 204, an electronic message is composed. The electronic message is, for example, an email, an SMS, an instant message, or other electronic messages.

Optionally, a sender 302 accesses a processor 304 (e.g., laptop, Smartphone, tablet, desktop computer) using a user interface 306 to compose the electronic message. The message may be composed using a message module 322A (e.g., email program, email client, instant message program) stored on a memory 320 electrically coupled to processor 304.

Figure 4:
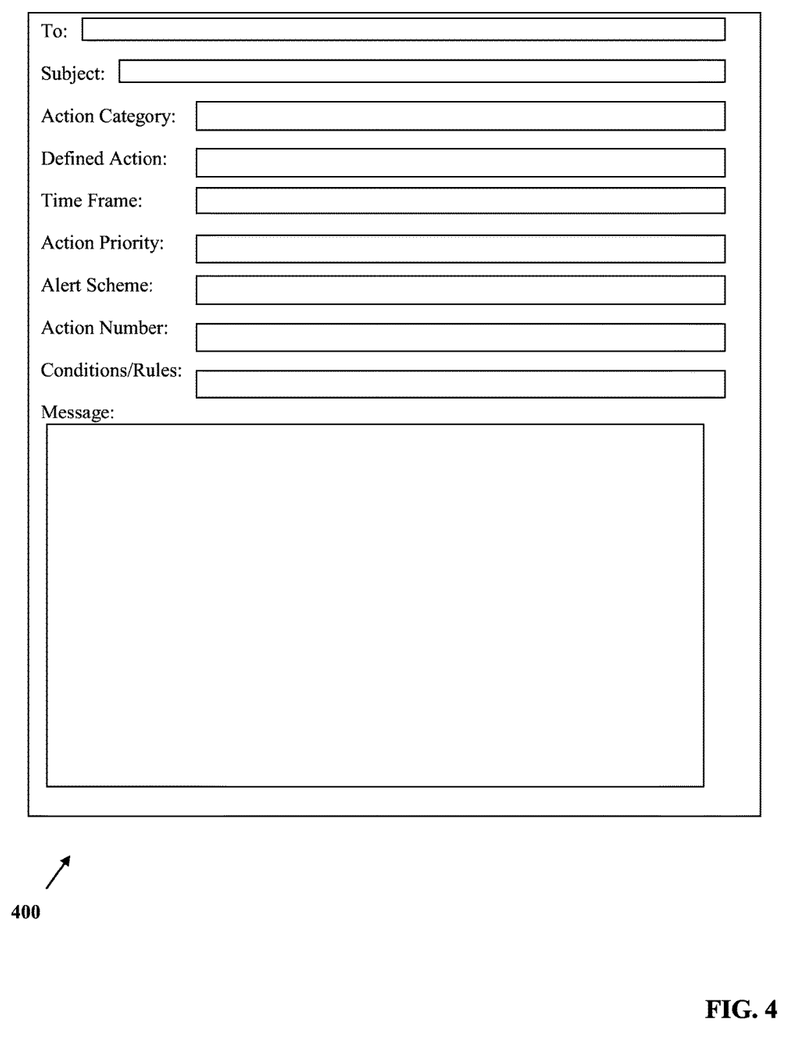
FIG. 4 is a schematic illustration of an exemplary user interface for a user to define an action for performance by a recipient, in accordance with some embodiments of the present invention.

Reference is now made to FIG. 4, which is a schematic illustration of an exemplary user interface 400 for a user (e.g., sender) to define an action for performance by the recipient, in accordance with some embodiments of the present invention. Optionally, the sender manually defines the action.

User interface 400 may contain fields for defining the action and/or time frame, for example, as described herein.

The values for the fields may be selected by a pull-down menu, manually typed, entered through a link, voice recorded (optionally using voice recognition software), or other methods.

Optionally, the category of action for the recipient to perform is selected based on the Action Category field. Actions may be categorized, for example, location based, application based, message based, and/or other categories, for example, as described herein.

The action for the recipient to perform is defined based on the Defined Action field. Optionally, the possible actions are based on the action category field. For example, 'read the message' is based on the 'message based' category, 'go to grocery store' is based on the 'location based' category, or other defined actions as described herein.

The time frame for the action is defined by the Time Frame field. The time frame may include, for example, an end point time and/or date, a range of time and/or dates, or other time frames. The time frame may be selected, for example, from a pop-up calendar, by manually entering the time and/or date, or other methods.

Alternatively or additionally, one or more rules are defined, instead of or in addition to the time frame, in field the Conditions/Rules. The rules may define, for example, when the action has been performed, for example, as described herein.

Optionally, the field Alert Scheme defines the pattern of automatically generated alerts to send to the recipient when the action has not yet been performed. The alert scheme may be selected based on a predefined alert algorithm and/or based on manually entered times and/or dates for sending the alerts, for example, as described with reference to block 216.

Optionally, the action is defined together with the composed message, for example, within a single frame as shown. Alternatively or additionally, the action is defined separately from the composed message, for example, after the message has been composed, after the message has been sent, before the message composition and/or sending, or at other times. Alternatively or additionally, the action is adjusted, for example, by opening up a file of a previously sent action, making the changes, and resending the update to the recipient.

Optionally, several actions may be defined in a chain, as described herein.

Optionally, the Action Number field specifies the number in the chain.

Alternatively or additionally, the Action Priority field denotes the priority of the action within the chain and/or the structure of the chain, for example, as described herein.

User interface 400 may contain standard message fields, for example, To (electronic address of the recipient), Subject, and/or Message (content of electronic message).

Optionally, at 206, the action and/or time frames are defined, for example, as described with reference to block 102 of FIG. 1.

Alternatively, no time frame is defined. Optionally, for the case of not defining the time frame, monitoring may be continuously and/or indefinitely performed until the action is detected (e.g., as in block 212). Optionally, alerts may be repeatedly sent until the action is performed, for example, at decreasing time intervals and/or following other alerting schemes (e.g., as in block 216).

Optionally, an action performance requirement defines other performance requirements for the action. The action performance requirement may be defined by the sender, before and/or after sending the electronic message. Optionally, the action performance requirement defines an automatic change in status of the electronic message upon reaching the expiration of the time frame. For example, the electronic message is deleted, snoozed (e.g., push out deadline time and/or date by a predefined amount), moved to another folder, forwarded, flagged, marked as expired, sent back to the sender, or other changes in status. Automatic deletions (or moving to a different folder) of expired messages may help keep the mail box of the recipient organized.

Alternatively, there is no change in status. Alternatively or additionally, the recipient is prompted for instructions after the expiration time, for example, to add more time, snooze the electronic message, or ignore.

At 208, the electronic message having the defined action and/or defined time frame is delivered to the recipient, for example, as described with reference to block 104 of FIG. 1.

Optionally, the electronic message is sent to multiple recipients, for example, using a list, a list server, or other methods. The defined action may be required for each recipient, for one recipient from the group, or for a subset of recipients of the group.

Optionally, electronic message 332 is delivered, with optionally attached defined action and/or time frame 334, for example, metadata within electronic message 332. The metadata may be program code for full performance of the method of FIG. 2, for example, detecting the action (block 212) and/or generating alerts (block 216) and/or other blocks. The metadata may define the action and/or time frame, for execution by one or more modules at message sever 318 and/or recipient processor 310. Alternatively or additionally, electronic message 332 is delivered separately from defined action 334. For example, a client-server model architecture, or other suitable architectures. Message server 318 may act as a client and/or as a server with respect to the sender and/or recipient. For example, a message database 336 stored on message server memory 326 and/or recipient memory 308 and/or sender memory 320 stores defined actions and/or time frames for sent messages. Blocks of the methods may be performed based on data within database 336. Other implementations may also be possible.

Alternatively or additionally, message 332 contains a link to message server 318 storing the contents and/or attachments of sent message 332. Links to stored message content may be generated, for example, by a link module 338. The link may be sent, for example, when the recipient has not registered for the service and the service does not have access to the electronic message account (e.g., as in block 202). The monitoring and/or managing of actions performed on the sent electronic message (e.g., blocks of FIG. 2) may be performed through accessing of links, for example, monitoring actions by the recipient on link module 338. Links may be invalidated after the expiration time. Optionally registered users (e.g., provided electronic message account credentials) receive the contents of the link (e.g., from link module 338) within sent message 332 (e.g., regular electronic message) rather than, or in addition to the link. The received electronic message may be deleted from the inbox after invalidation (i.e., after time expiration without extension). Optionally, clients (e.g., legacy clients, registered users) are able to access the contents of the link for a certain period of time, and take relevant action. The link may be invalidated after the expiration of time period, and the content may no longer be accessible (including attachments).

Optionally, at 210, the recipient is notified of the existence of the electronic message. For example, the recipient is notified by another message, a phone call, a pop-up message, a blinking light, or other methods, that the electronic message has been delivered into the inbox and waiting for a response.

Optionally, the recipient is advised of the action to be taken, for example, to read the message, access a link within the message, make a purchase based on the message, or other actions. Alternatively, the recipient is not advised of the action to be performed. Performance of the action may be detected without informing the recipient and/or kept hidden with an option for the recipient to view.

Optionally, the recipient is advised of the time frame during which the action is to be taken, for example, the deadline (date and/or time) and/or number of minutes (and/or hours and/or days) until the deadline. Alternatively, the recipient is not advised of the deadline. The deadline may be kept hidden.

Optionally, one or more alerts are generated and delivered to the recipient, for example, by one or more alert modules 328A-C. The alerts may draw special attention to the presence of the electronic message. For example, the electronic message may be a high priority message requiring urgent attention, and/or the recipient may not be checking email.

The notification alert may be, for example, an additional email (e.g., automatically generated by message server 318, and/or one or more of alert modules 328A-C). Alternatively or additionally, the notification alert is an out-of-band notification. Examples of notifications include: Push Notifications (e.g., as offered by Apple® and/or Android®), a pop-up, an SMS or a phone call asking the recipient to direct attention to the electronic message.

Optionally, the notification may operate in an offline mode. Optionally, a synchronization module 340 stored on recipient memory 308 provides for operation (e.g., one or more blocks of FIG. 2) in an offline mode without a current network connection. Synchronization module 308 may connect to message server 318 when operating in an online mode (active network connection), to synchronize data.

Optionally, alert are generated (e.g., by alert module 328B) based on a local time module when in the offline mode. Monitoring for completion of the task may continue when in offline mode, for example, by detection module 324B. Alternatively, when in offline mode, an assumption is made that the recipient has not completed the task, and alerts are generated accordingly. In this manner, the recipient may be reminded to perform the action even when not connected to the network, for example, through phone calls, messages to the phone of the recipient, or other communication channels that may be available during the offline mode. When reverting back to the online mode, the alerts may be generated based on synchronization with a time server (e.g., of message server 318).

Optionally, at 212, the performance of the defined action is detected, for example, as described with reference to block 106 of FIG. 1.

Alternatively or additionally the status of the electronic message is monitored. Monitoring may be performed by detection module 324B, for example, when the received message resides on memory 308 of recipient processor 310. Monitoring may be performed by detection module 324C, for example, when the electronic message resides on memory 326 of message server 318. Monitoring may be performed by detection module 324B sending messages (e.g., based on actions taken by the recipient at the recipient processor) to detection module 324C, where the sent messages are processed as part of the monitoring.

Optionally, the monitoring is performed by monitoring actions performed on the message itself (e.g., for message based actions), actions performed on the application (e.g., for application based actions), and/or by monitoring received location data from a data server (e.g., for location based actions).

Optionally, the action is location based, and the monitoring detects the recipient being at the defined location. Alternatively or additionally, the action is location based with a time frame, and the monitoring detects the recipient being in the location within the defined time frame.

Optionally, the status of the electronic message is independent and/or different than the defined action. For example, the sender is notified when the email has been read, changed to or remaining at unread, flagged, forwarded, deleted, links accessed, attachments opened, or other possible tasks.

Optionally, the status of the electronic message is monitored until the defined action has been performed. Alternatively or additionally, the status is monitored until the defined end of the time frame has been reached. Alternatively or additionally, the status is monitored until another predefined point, for example, 1 month after the time frame, 1 year after the time frame, or other time frames. Alternatively or additionally the status is monitored indefinitely.

Optionally, at 214, the sender of the electronic message is notified of the detected action. Optionally, the sender is notified that the action took place.

Alternatively, the sender is notified that the action has not yet taken place.

Optionally, the sender receives an indication of the status of the defined action.

Optionally, detection module 324B and/or 324C automatically generates an electronic message indicative of performance of the defined action. Optionally, detection module 324B and/or C sends the generated message to the user, for example to a receiving module installed on sender memory 320.

Alternatively or additionally, the sender is notified of the current status of the electronic message (e.g., block 212).

The sender may be notified by one or more notification methods, for example, as described with reference to block 204.

Optionally, at 216, one or more reminder alerts are generated, for example, by one or more alerting modules 328A-C. Optionally, the reminder alerts are generated based on the time remaining until the end of the time frame. The alert may specify that the electronic message has not yet been handled, such as read and/or that the required action has not been performed. The alert may indicate the remaining time until the end of the time frame and/or message deletion, for example, "T minutes remaining".

Optionally, the generated alerts are sent to the recipient. The alerts may remind the recipient that the required action has not yet been performed. Optionally, the alert is sent to the recipient as a reminder to perform the action for the electronic message within the defined time frame.

Optionally, the generated alerts are sent to the sender. The alerts may signify to the sender that action has not yet been taken by the recipient. The sender may take other courses of action, for example, calling the recipient, sending another message, or other courses of action.

Optionally, the alerts are generated based on an alerting algorithm. Optionally, the alerting algorithm defines a predetermined number of alerts, divided over the course of the due time (e.g., equal spacing, acceleration of the rate of alerts as the due time approaches). The alerting algorithm may define another predetermined number of alerts over the final time period (e.g., 30 minutes, 1 hour, 2 hours, or other) before the deadline. Different alerts may be sent each time, depending on the amount of time left, for example, labeled as friendly reminder, ASAP, urgent, critical, or other messages. Different alerting algorithms may be defined, manually by the user, automatically by software, and/or preprogrammed by the manufacturer.

Optionally, at 218, the recipient performs other actions related to the electronic message, that are not defined as required actions. For example, highlighting text in the email, copying from the email, forwarding the email, or other actions.

Optionally, the recipient diverts (e.g., forwards and/or delegates) the received electronic message and/or related time frame to another recipient. The other recipient might bear the responsibility of handling the electronic message and performing the required action. Alternatively or additionally, the original recipient maintains the responsibility to make sure that the other recipient performed the action.

The original sender may be aware of the diversion and/or other actions, for example, by monitoring the actions of the first recipient, and then monitoring the actions of the second recipient. Notification may be sent to the sender of the actions taken. The original sender may be unaware of the diversion and/or other actions, for example, by monitoring for the required action performed on the send electronic message, independently of who actually performs the action and/or independently of any other actions performed on the electronic message.

Optionally, at 220, at least one action is performed by the recipient outside the scope of the electronic message. The action is not performed directly on the electronic message itself. The action may be based on the electronic message (e.g., following instructions in the electronic message), or may be independent of the electronic message.

Optionally, monitoring for the non-message actions is performed by an external action interface 342 (or module) for connecting to an external data generator, or other methods. External action interface 342 may be in electrical communication with processor 304, processor 310, message server 318, or may exist independently (e.g., connecting through network 346 or other networks). External action interface 342 may connect to external data and/or $3^{rd}$ party sources. Examples of non-message actions detected include: location based such as arrival at a specific location (e.g., data from a location based server such as a global positioning system (GPS) 344A); device based such as calling the sender or a $3^{rd}$ party (e.g., data from a phone 344B), application based such as sending an SMS, downloading an application, purchasing an item (e.g., data from a network 344C, and/or from processor 310).

Blocks in FIG. 2 may be performed related to the non-message actions.

Optionally, the recipient is monitored to detect the performance of the non-message actions (e.g., block 212), for example, to detect when the recipient went to the grocery store to buy milk as instructed by a sent text message. Partial performance of the requested action may be monitored, for example, when the recipient is en-route to the grocery store. Indirect consequences may be taken into account, for example, the recipient missing a meeting due to being stuck in traffic on the way to the grocery store. The monitored non-message actions may be reported to the sender (e.g., block 214).

Optionally, at 222, the action is updated, for example, adjusted and/or redefined. The defined action and/or time frame may be adjusted before the time frame, during the time frame, and/or after the time frame.

Optionally, the action and/or time frames are updated by an update module 348. The updates may be manually entered by the user. Optionally, update module 348 sends a message to recipient processor 310 and/or message server 318 indicative of the updated action. Optionally, monitoring is performed to detect the updated action, for example, by detection modules 324B and/or 324C.

Optionally, the sender manually redefines the action. Alternatively or additionally, a software application automatically redefines the action. The time frame may be lengthened, shortened, additional time frames may be added, conditions may be added, additional actions may be added, actions may be removed, or other adjustments.

Optionally, the system suggests to the sender to adjust the action. For example, when no action has been taken, when a situation changed that warrants change in the action, or based on other factors.

Optionally, the system suggests to the sender to lengthen the permitted time frame defined by the action and/or change the due date until the expiration of the electronic message.

Optionally, at 224, the electronic message is monitored for performance of the defined action and/or other actions. Alternatively or additionally, non-message actions are monitored.

Monitoring may be continuous and/or periodic (e.g., only when the recipient is accessing the message inbox).

Optionally, one or more of blocks 212, 214, 216, 218, 220 and/or 222 are repeated.

Optionally, at 226, the define time frame for performance of the action has passed.

Optionally, the status of the electronic message is manually and/or automatically changed, for example, as described in block 206, for example, the electronic message is deleted from the inbox of the recipient and/or sent items folder of the sender.

Optionally, the message is snoozed, revived, undeleted, or otherwise reactivated. The revived message may be resent, and/or the action may be revived and/or adjusted. Alternatively, a new message (similar or modified) is sent with a new defined action. The method may be repeated, for example, starting from block 204, 206, 208, 210, 212, or other suitable locations.

In one example of applying the methods and/or systems of FIGS. 1-4, a person sends an email to a recipient, defining the action that the email be replied to, with the time frame defined as before the recipient boards a predetermined flight. While the recipient is on the way to the airport, alerts are sent to the Smartphone of the recipient. When the recipient does not reply, additional more frequent alerts are sent. While waiting to board the flight, the recipient replies to the message, thereby completing the defined action within the time frame. The original message may be automatically deleted.

In another example, a supervisor sends an email to a secretary, asking the secretary to schedule a meeting for next week. The user defines the requested action as scheduling the meeting within a 24 hour time frame (to allow enough heads-up time for the participants). Alerts are constantly sent to the secretary as reminders until the meeting has been scheduled.

In yet another example, a salesperson hosting a sales conference sends a message to another salesperson asking the other person to buy milk for coffee on the way to the meeting. The user defines the requested action as buying milk, and the time frame as the start of the meeting. The Smartphone of the other salesperson tracks the location of the salesperson, and sends notifications until a grocery store has been entered and milk has been bought.

It is expected that during the life of a patent maturing from this application many relevant electronic message methods and systems will be developed and the scope of the term electronic message is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this present invention may be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the present invention, which are, for clarity, described in the context of separate embodiments, may also be provided in combination in a single embodiment. Conversely, various features of the present invention, which are, for brevity, described in the context of a single embodiment, may also be provided separately or in any suitable subcombination or as suitable in any other described embodiment of the present invention. Certain features described in the context of various embodiments are not to be considered essential features of those embodiments, unless the embodiment is inoperative without those elements.

Although the present invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of recipient management with electronic messages having time defined actions comprising:
using a processor of a message server for:
receiving data inputted by a user, and an electronic address of the recipient at a user client terminal;
creating an electronic message and defining for the electronic message at least one non-message action for the recipient associated with the electronic address inputted by the user, to perform at a location within a defined time frame, said at least one non-message action and said time frame are defined in a metadata included in said electronic message;
sending the electronic message to the electronic address of the recipient for access by a recipient client terminal of the recipient;
triggering an external data source to monitor performance of the at least one non-message action by the recipient associated with the electronic address inputted by the user during the defined time frame according to said metadata, said monitoring detects the recipient being at the location at the defined time frame and performing the at least one non-message action at the location and at the defined time frame; wherein the external data source is in electrical communication with said message server and is independent of actions performed on the electronic message by the recipient client terminal;
receiving via a network an indication of the performance of the at least one non-message action based on the monitoring from the external data source; and
sending instructions to present on the user client terminal a notification in response to the indication.

2. The method of claim 1, wherein the at least one non-message action is the recipient being in a location within a certain time frame.

3. The method of claim 1, wherein defining comprises defining a chain of the at least one non-message actions that defines the order of performance of the at least one non-message actions by the recipient.

4. The method of claim 3, wherein the chain is hierarchal and/or sequential.

5. The method of claim 1, wherein defining comprises defining rule dependent actions that detect performance of the rule dependent actions when at least one rule terms are held.

6. The method of claim 1, further comprising receiving an update to the at least one non-message action, and sending a message to the recipient client terminal indicative of the updated action, to monitor performance of the updated non-message action.

7. The method of claim 1, wherein the receiving an indication comprises receiving an electronic message automatically generated by the client terminal indicative of the performance.

8. The method of claim 1, further comprising sending or locally presenting at least one alert to the recipient to perform the at least one non-message action for the electronic message within the time frame.

9. The method of claim 8, further comprising sending or locally presenting a plurality of alerts over time to one or both of the recipient and the user based on the amount of time left until the end of the time frame.

10. The method of claim 1, wherein the time frame comprises a deadline time and/or a date for performing the at least one non-message action.

11. The method of claim 1, wherein the time frame comprises number of minutes left until expiration of the electronic message.

12. The method of claim 1, wherein the electronic message is selected from the group: email, instant message, short message service (SMS) message.

13. The method of claim 1, further comprising automatically adjusting the time frame in response to the monitoring of performance of the at least one non-message action, at least one of before and after the time frame has elapsed.

14. The method of claim 13, wherein the adjusting comprises automatically snoozing the electronic message after the time frame has elapsed so that a deadline time and/or date is delayed by a predefined amount.

15. The method of claim 1, wherein defining comprises receiving a manual definition from the user of the electronic message.

16. The method of claim 1, further comprising automatically deleting the electronic message after the time frame has lapsed.

17. The method of claim 1, further comprising monitoring for performance of actions other than the at least one non-message action at least one of before and after the time frame.

18. The method of claim 17, further comprising providing the monitoring of actions other than the at least one non-message action for presentation on the user client terminal.

19. The method of claim 1, wherein each action of a plurality of at least one actions has a different time frame.

20. The method of claim 19, further comprising alerting one or both of the recipient and the user with different alerts based on the different time frames.

21. The method of claim 1, further comprising alerting one or both of the recipient and the user that the electronic message will be expiring based on the amount of time left until the end of the time frame.

22. The method of claim 1, wherein sending comprises sending the electronic message to a plurality of recipients; and detecting comprises detecting the performance of the at least one non-message action by at least one of the plurality of recipients.

23. The method of claim 1, further comprising diverting the electronic message and related at least one non-message action, from the recipient to a different recipient.

24. The method of claim 1, wherein the at least one non-message action is performed outside the scope of the electronic message.

25. The method of claim 24, wherein monitoring comprises monitoring for partial completion of the at least one non-message action.

26. A system for electronic message communications having time defined actions, comprising:
a hardware processor of a message server; a non-transitory memory having stored thereon program modules for instruction execution by the hardware processor, comprising:
code instructions for receiving data inputted by a user, and an electronic address of the recipient at a user client terminal;
code instructions for creating an electronic message and defining for the electronic message at least one non-message action for the recipient associated with the electronic address inputted by the user, to perform at a location within a defined time frame, said at least one non-message action and said time frame are defined in a metadata included in said electronic message;

code instructions for sending the electronic message to the electronic address of the recipient for access by a recipient client terminal of the recipient;

code instructions for triggering an external data source to monitor performance of the at least one non-message action by the recipient associated with the electronic address inputted by the user during the defined time frame according to said metadata, said monitoring detects the recipient being at the location at the defined time frame and performing the at least one non-message action at the location and at the defined time frame, wherein the external data source is in electrical communication with said message server and is independent of actions performed on the electronic message by the user client terminal;

code instructions for receiving an indication of the performance of the at least one non-message action from the external data source;

code instructions for sending instructions to present on the user client terminal a notification in response to the indication.

27. The system of claim 26, wherein said non-transitory memory having code instructions for updating the at least one non-message action.

28. The system of claim 26, further comprising:
a user interface for manually receiving the at least one non-message action from the user of the electronic message.

29. The system of claim 26, wherein said non-transitory memory having code instructions for deleting the electronic message from an email account of the one or both of the user and the recipient based on the detection.

30. The system of claim 26, wherein the non-transitory memory resides on a remote server, at least one of the user and a recipient are registered users on the remote server, the remote server having access data for accessing email accounts of the at least one of the user and the recipient.

31. The system of claim 26, wherein said non-transitory memory having code instructions for generating a link to a server storing contents of the electronic message, wherein the link is sent to the recipient; wherein the monitoring automatically detects the performance of actions based on the link.

32. The system of claim 26, wherein the system resides on a processor remotely located from the recipient and sender, the system acting as one or both of a client and a server with respect to one or both of the recipient and sender.

33. The system of claim 26, wherein the sent message contains metadata defining the action and time frame.

34. The system of claim 26, wherein said external source comprises a second hardware processor and a second non-transitory memory.

35. The system of claim 26, wherein the system resides on a server remotely located from the recipient and user, the system further comprising a network interface for allowing one or both of the recipient and user to remotely access the system.

36. The system of claim 26, wherein said non-transitory memory having code instructions for triggering said monitoring to operate in an offline mode without a network connection.

37. The system of claim 36, wherein said non-transitory memory having code instructions for generating alerts to the recipient for performance of the at least one non-message action based on the time frame; wherein said non-transitory memory having code instructions for generating alerts based on a local time module when in offline mode and generating alerts based on synchronization with a time server when in online mode.

38. The system of claim 26, further comprising an external action interface for monitoring actions of the recipient for performance of the at least one non-message action, wherein the at least one non-message action is outside the scope of the electronic message.

39. The system of claim 38, further comprising one or more elements for monitoring actions of the recipient, comprising: a location based server for detecting the position of the recipient, a call module for monitoring phone calls of the recipient, a short message service (SMS) module for monitoring SMS sent by the recipient, a download module for monitoring application downloads by the recipient, and a purchase module for monitoring online purchases by the recipient.

40. The method of claim 1, further comprising sending a reminder to the electronic address of the recipient when the recipient is detected as not being at the location at the defined time and not having completed the at least one action.

* * * * *